Figure 1:
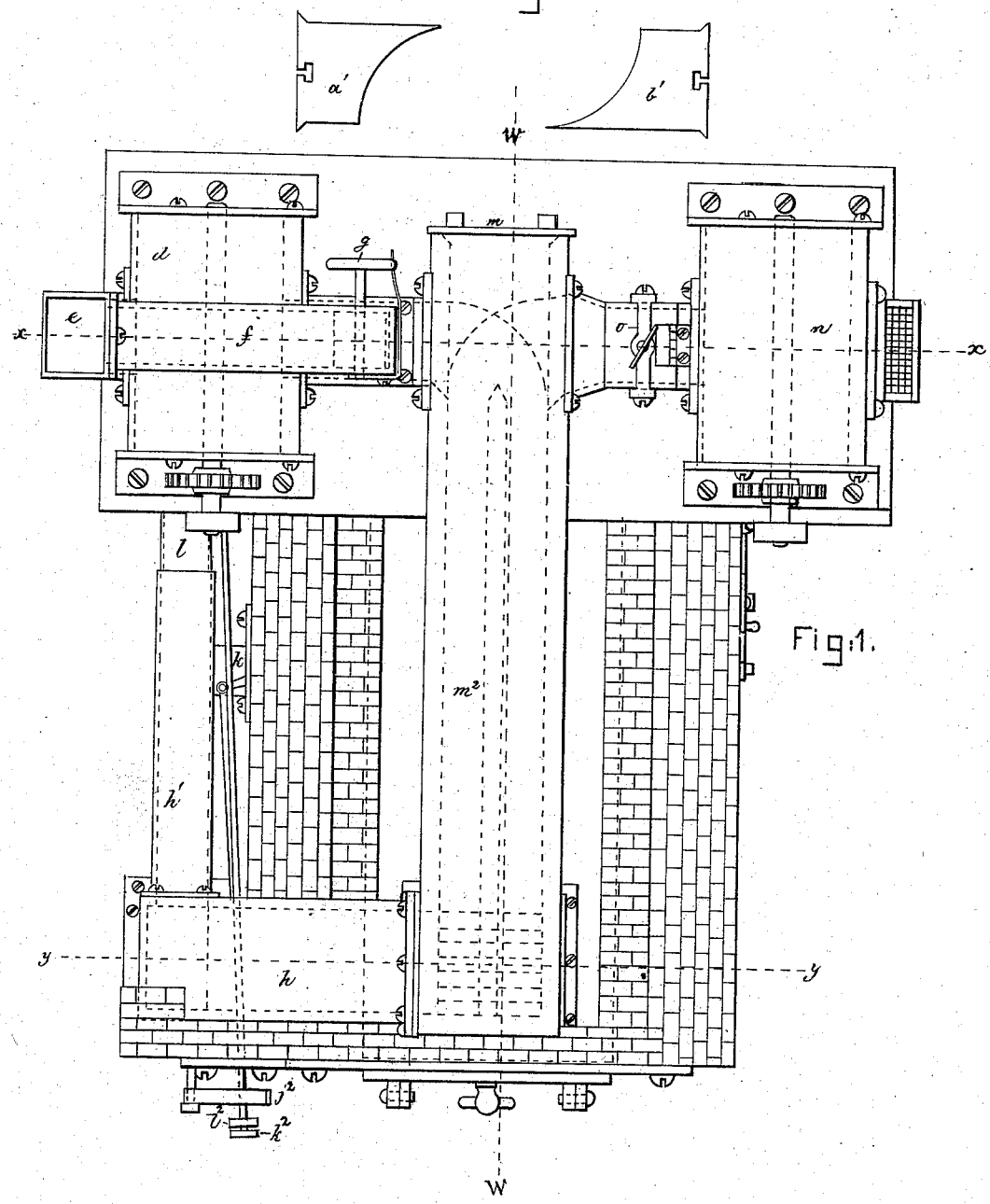

O. MARLAND.
Apparatus for Combustion of Fuel for Generation of Steam.

No. 205,282. Patented June 25, 1878.

7 Sheets—Sheet 3.

O. MARLAND.
Apparatus for Combustion of Fuel for Generation of Steam.

No. 205,282. Patented June 25, 1878.

Witnesses-
A. Hunerwadel.
L. A. Baxter

Inventor-
Obadiah Marland
by Crosby & Gregory, Atty

7 Sheets—Sheet 4.

O. MARLAND.
Apparatus for Combustion of Fuel for Generation of Steam.

No. 205,282. Patented June 25, 1878.

Witnesses—
A. Hunerwadel
L. A. Baxter

Inventor—
Obadiah Marland
by Crosby Gregory
Attys

N. PETERS, PHOTO-LITHOGRAPHER, WASHINGTON, D. C.

7 Sheets—Sheet 6.

O. MARLAND.
Apparatus for Combustion of Fuel for Generation of Steam.

No. 205,282. Patented June 25, 1878.

Witnesses.
A. Hunnewadel.
L. A. Baxter.

Inventor.
Obadiah Marland
by Crosby & Gregory, Attys

7 Sheets—Sheet 7.
O. MARLAND.
Apparatus for Combustion of Fuel for Generation of Steam.
No. 205,282. Patented June 25, 1878.
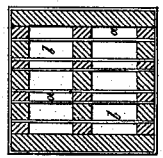
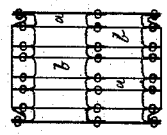
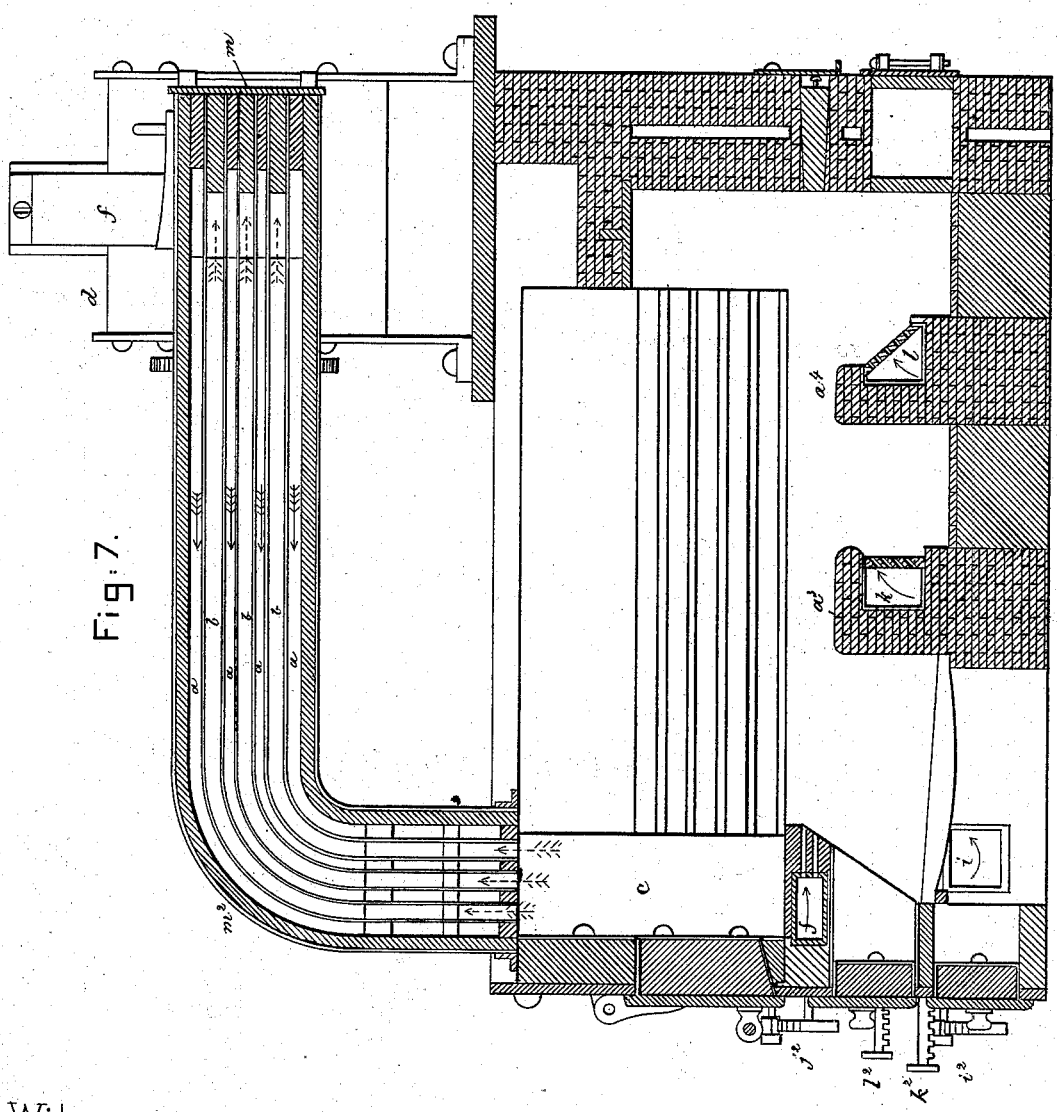

UNITED STATES PATENT OFFICE.

OBADIAH MARLAND, OF BOSTON, MASSACHUSETTS.

IMPROVEMENT IN APPARATUS FOR COMBUSTION OF FUEL FOR GENERATION OF STEAM.

Specification forming part of Letters Patent No. 205,282, dated June 25, 1878; application filed February 9, 1878.

*To all whom it may concern:*

Be it known that I, OBADIAH MARLAND, of Boston, in the county of Suffolk, State of Massachusetts, have invented an Improvement in Apparatus for the Combustion of Fuel for Generation of Steam and other purposes, of which the following is a specification:

This invention is designed to abstract and utilize the heat escaping in the volatile products of combustion of fuel in such manner as to reduce the temperature of the escaping volatile products of combustion to an approximation with the temperature of the atmosphere, thus economizing fuel, and to apply the heat so abstracted to the current of ordinary atmosphere coming to the furnace, so as to improve the combustion of the solid fuel and of the gases escaping therefrom.

In this invention mechanical power is applied to draw the volatile products of combustion from the furnace and furnace-passages and chambers therewith connected, the atmosphere passing by operation of the laws of nature to supply the place of that which has been abstracted from the furnace, the atmosphere being drawn through flues, pipes, or passages, interspaced with other flues, pipes, or passages, through which the escaping volatile products of combustion are drawn, said flues, pipes, or passages being made of sheets of metal or other good conducting material, and so formed and shaped as to give large conducting-surfaces as compared with the cubic capacity of the flues.

While this invention is applicable to all furnaces in which fuel is consumed for generation of heat to be applied to any purpose, it will be herein explained and illustrated as applied to a furnace connected with a boiler used for generating steam.

The value of an artificial draft, as compared with a draft kept up by combustion through the instrumentality of a chimney, is known to engineers, and is variously stated by different authorities. In two instances cited by Peclet the gain given as ascertained was in one case about as six to one, and in the other as seventeen to one; and to this gain this invention adds the gain due to the abstraction and utilization of a very large percentage of the heat contained in the escaping volatile products of combustion after they have passed the last point where the heat contained therein is applicable to any useful purpose, coupled with the gain to be had from the introduction of highly-heated pure air into the escaping products of combustion at desirable points in the space occupied by them, until very nearly all that is combusible therein is consumed and made to give up the heat consequent upon such combustion.

In what this invention consists will be stated in the claims following the description of its practical illustration.

Figure 2:
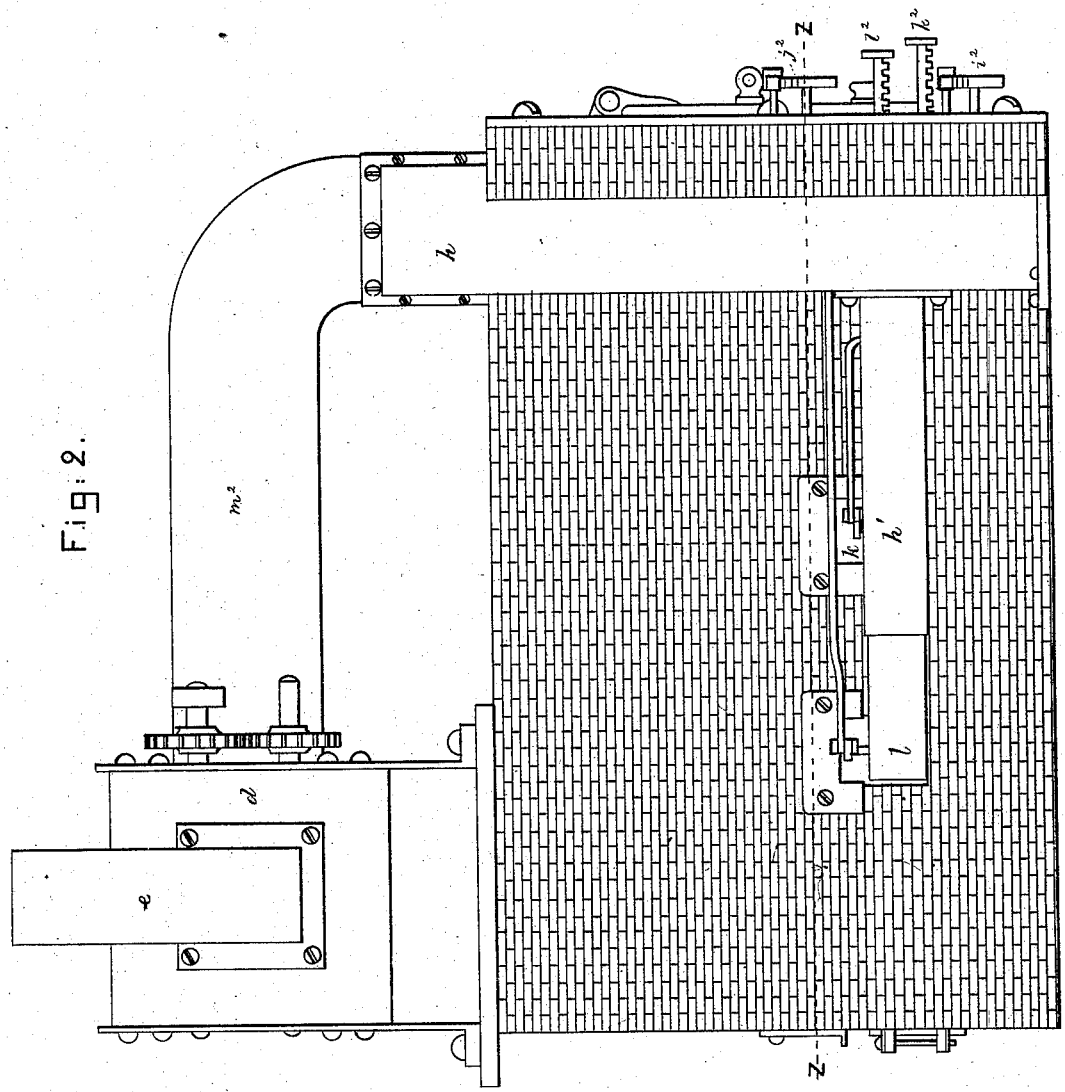
Figure 3:
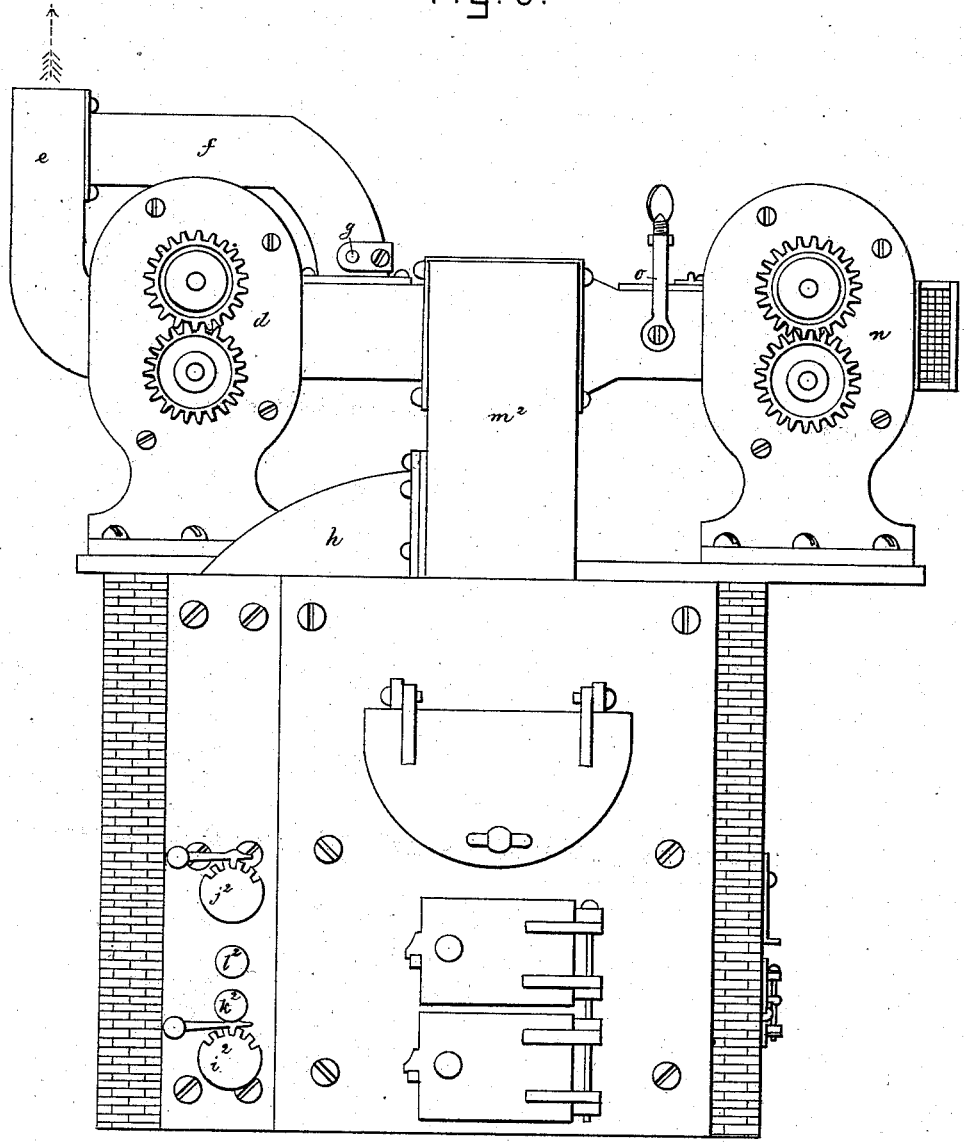
Figure 4:
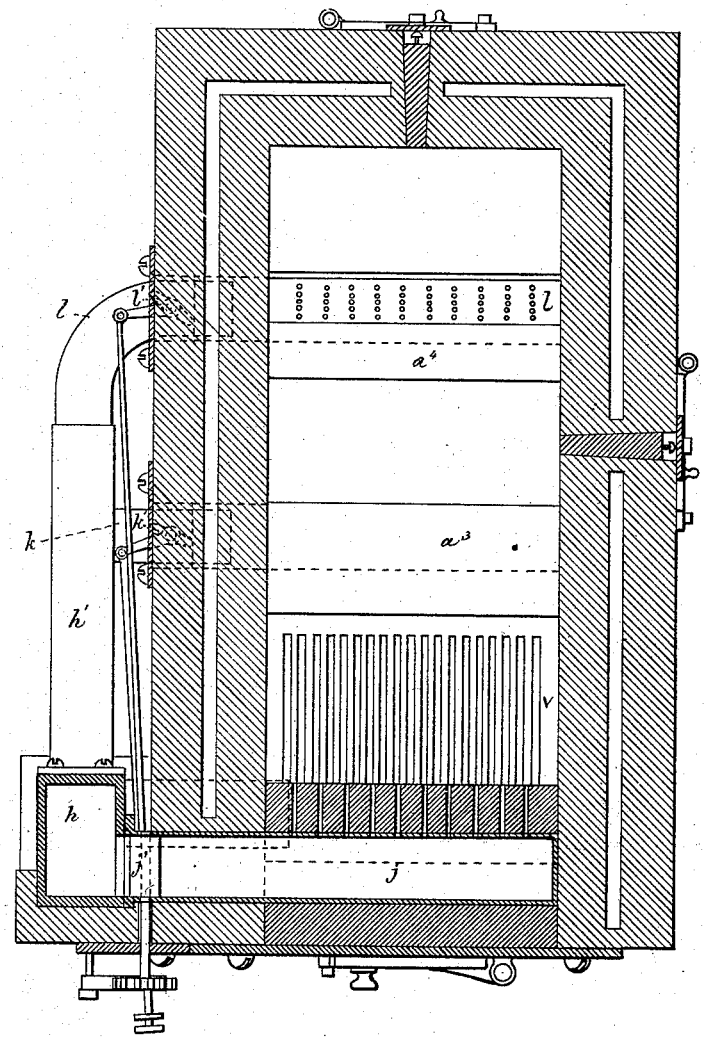
Figure 5:
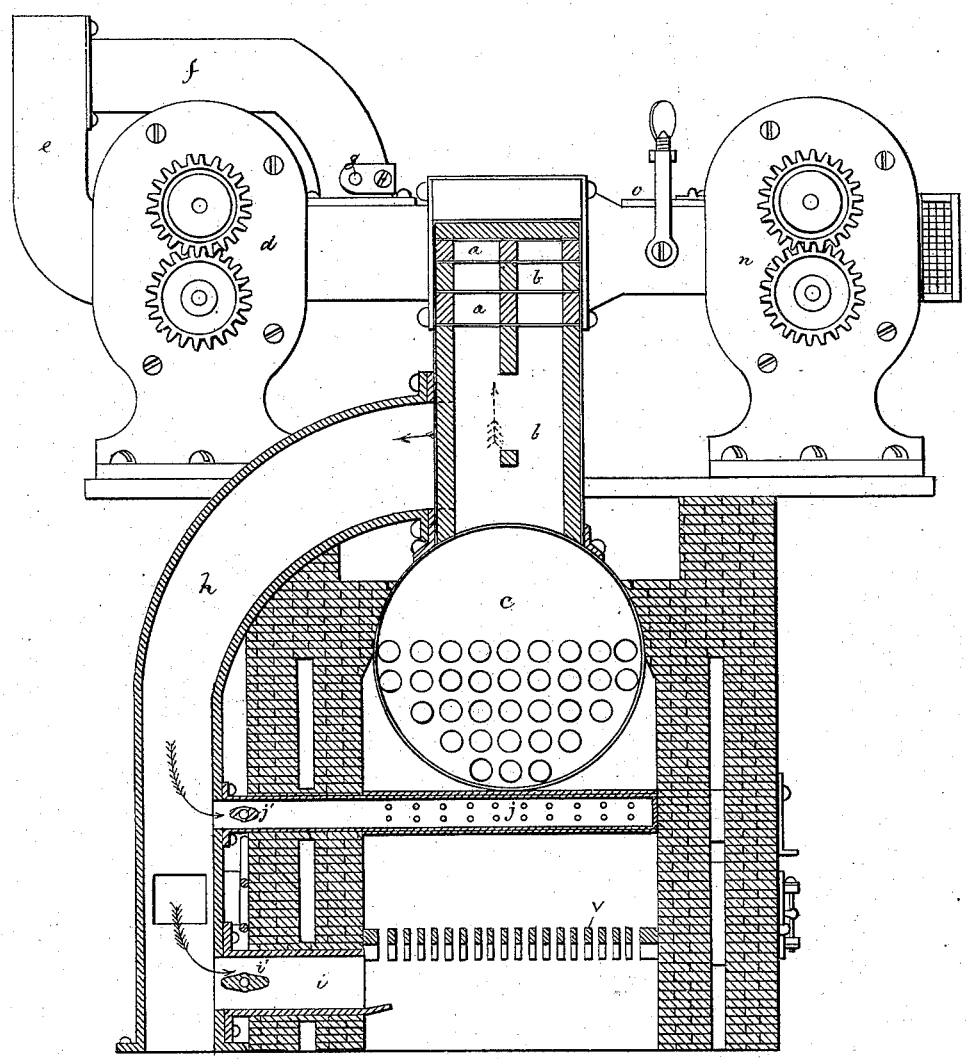
Figure 6:
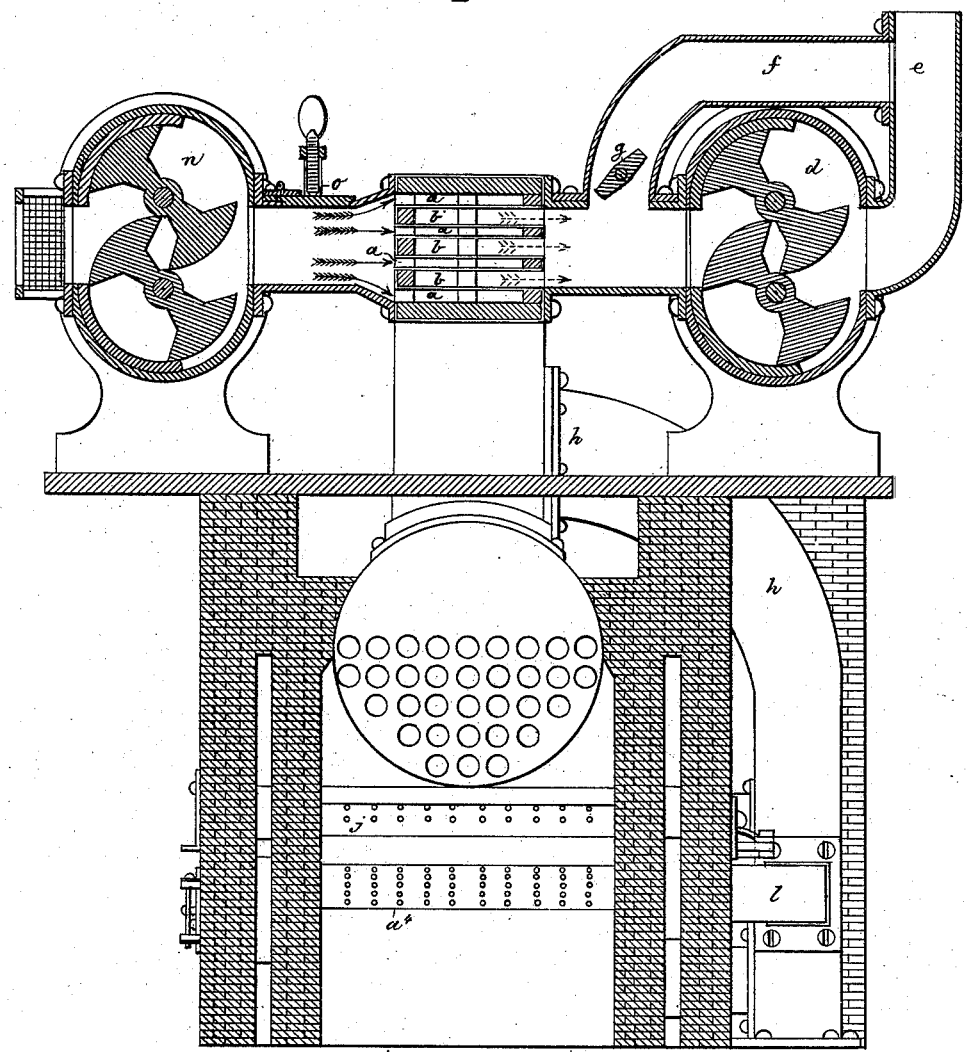

Of the drawings, showing an embodiment of this invention as applied to a boiler for generating steam, Figure 1 is a plan. Fig. 2 is a side elevation. Fig. 3 is a front end elevation. Fig. 4 is a horizontal section taken on the line $z\ z$, Fig. 2. Fig. 5 is a cross vertical section taken on the line $y\ y$, Fig. 1. Fig. 6 is a cross vertical section taken on the line $x\ x$, Fig. 1. Fig. 7 is a longitudinal vertical section taken on the line $w\ w$, Fig. 1. Figs. 8, 9, and 10 are details which will be specified beyond.

$v$ shows the grate-bars of a furnace, which is set or made of brick-work to support a horizontal tubular boiler, the walls being hollow, and other well-known means of preventing loss of heat by radiation being applied as shown. The combustion-chamber above the grates has the boiler as its crown or upper boundary, the volatile products of combustion from the combustion-chamber (which in this case is the entire space under the boiler, including the rear up-take) escaping through the boiler-tubes into the front smoke-box.

Over the boiler-setting is a device, $m^2$, which will herein be termed the "abstracter," its function being to allow the passage through one set of channels or passages therein of pure air, so that the heat contained in the volatile products of combustion, passing through another set of channels or passages in the abstracter, will be absorbed through the division-plates of the abstracter by the air going to support and improve the combustion of the fuel and of the gases liberated therefrom.

The arrangement of this abstracter $m^2$, in order to produce the best results, is such as to cause the outgoing gases to move in a direction contrary to the incoming air, the latter entering near where the gases are escaping, and where, consequently, they are coolest, and progressing toward the furnace, receiving constantly new increments of heat. The outgoing gases move as indicated by dotted arrows, and the movement of the incoming air is indicated by arrows in full lines.

The passages marked $a$ in the abstracter are those conveying air, and those marked $b$ are those conveying gases from the smoke-box $c$. The passages $b$ connect with an exhausting device, $d$, which is shown in the drawings in the form of what is known as the "Root blower." Other forms of rotary blowers or fans, or other devices for exhausting or for reducing pressure, would serve the purpose.

The discharge from the exhausting device is through the conduit $e$, which, when convenient or needed, may be coupled to a chimney. In cases where, in starting a fire to generate steam in the main boiler, no auxiliary power is available for working the exhauster $d$, a passage, $f$, is provided to permit the gases to pass off by their own levity, a valve, $g$, being arranged so as to make the passage $f$ operative or inoperative at will. In such case the air is shut off from the passages $a$, so as not to cool the escaping gases, and the air is admitted under the grates through the ash-pit door in the usual manner until steam of sufficient pressure is generated to work the motor which drives the exhauster, at which time, the motor being put in operation, the valve $g$ and the ash-pit door are closed, and air is admitted to the passages $a$ to take up the heat existing in the gases moving from the furnace in the passages $b$.

The passages $a$ and $b$ are made thin and flat, so as to give large heating and absorbing surfaces in proportion to their cubic capacity, and the whole assemblage of them is covered by a suitable non-conductor to prevent radiation of heat.

Fig. 8 shows a cross-section of the abstracter, and Fig. 9 is a detail, in cross-section, of a modification thereof.

All of the passages $a$ connect with an air-pipe, $h$, which communicates with branch pipes, one of which, $i$, having its controlling-valve $i^1$, leads one supply of heated air under the grates. Another, $j$, having its valve $j^1$, admits air directly into the furnace over the fuel. Another, $k$, having its valve $k^1$, admits hot air behind the first bridge-wall, $a^3$; and another, $l$, having its valve $l^1$, admits hot air behind the second bridge-wall, $a^4$, into the space behind it and into the rear up-take, there completing combustion of the escaping gases.

These bridge-walls, with passages arranged for emitting air in finely-divided streams, may be as numerous as the length of the furnace will allow, and there will be seen in the drawings provision for clearing out solid deposits from between and beyond the bridge-walls and for peep-holes for observing the character of the combustion, while the valves $i^1 j^1 k^1 l^1$ afford means for regulating and controlling the character and rate of combustion.

The passages $a$ in the abstracter receiving only pure air to be heated will not be likely to become coated or obstructed with any deposit, as will the passages $b$ for the escaping gases. Both sets of passages can be cleared readily by removal of the plate $m$ at the rear of the abstracter and by removal of the filling-pieces $a^1 b'$, seen in detail Fig. 10.

In some cases, as in boilers for naval and marine use, and where on land large power is located in confined space, and where usually small auxiliary or donkey engines and boilers are kept in constant readiness for use, it may sometimes be advisable to make use, in connection with an exhauster of the waste gases, of a blower of any suitable form, for forcing the pure air through the passages $a$, in reenforcement of the exhauster, instead of simply allowing the air to follow naturally the gases as removed by the exhauster.

In the drawing, $n$ represents a device for forcing air into the passages $a$, it being driven in any suitable manner. When the exhausting and forcing devices are employed in combination, and when it is desirable to disuse the forcing device, a valve or door, $o$, is made removable, to admit the air direct into the passages $a$.

In most cases the use of the exhauster alone is preferable, as then the gases and dust are not forced out of the furnace through crevices or through the firing and ash-pit doors, when these are opened for the performance of the duties of the fireman; and when the pressure device, in combination, is used for supplying air, it is preferable to regulate its action so as to cause the pressure in the furnace not to exceed that of the atmosphere, except in cases of emergency.

In the use of the abstracter, the supply of a small surplus of air to the furnace does not result in a material loss, inasmuch as the heat which it takes up in the furnace and carries away from it is given back to the air passing to the furnace through the medium of the abstracter.

In locomotives, the exhauster and abstracter may be used in connection with the furnace, which preferably should have its combustion-chamber made as large as is practicable. In such cases the exhaust steam should be let freely off from the cylinder, to relieve the pistons from back-pressure.

The valves $j^1 i^1$ are opened and closed through the valve-rods $j^2 i^2$, and the valves $l^1 k^1$ through the rods $l^2 k^2$. (See Figs. 3 and 7.) The heads of the rods $j^2 i^2$ are notched or otherwise suitably shaped to be locked in position, as are also the stems of the rods $l^1 k^1$.

I describe as a mechanical exhauster any machine, such as a bellows, a rotating or reciprocating pump, or a rotating fan, or centrifugal machines.

I claim—

1. The combination of a furnace and abstracter with a mechanical exhauster, substantially such as described, to operate as and for the purpose set forth.

2. The combination of an air-forcing device, furnace, abstracter, and a mechanical exhauster, substantially such as described, for the purpose specified.

3. The abstracter, composed of plates or sheets of conducting-material formed, as described, into chambers $a$ $b$, alternately arranged for passage of air and volatile products of combustion, and of removable filling-pieces, the abstracter being combined with the discharging end of a furnace and with the furnace-space over the grate-bars.

4. An exhauster and an abstracter, with passages $a$ $b$, formed and arranged as described, in combination with the discharging end of a furnace, and by means of a suitable passage with the space under the grate-bars, for the purpose described.

5. An exhauster and an abstracter, with passages $a$ $b$, formed and arranged as described, in combination with the discharging end of a furnace, and by means of a suitable passage with the combustion-chamber at or beyond the first bridge-wall, for the purpose described.

6. The abstracter, composed of metallic plates or sheets placed with relation each to the other, as shown, to form chambers $a$ $b$, and of the removable filling-pieces, to permit the abstracter to be cleaned, substantially as described.

In testimony whereof I have signed my name to this specification in the presence of two subscribing witnesses.

OBADIAH MARLAND.

Witnesses:
  G. W. GREGORY,
  L. A. BAXTER.